US012289244B2

(12) United States Patent
Varga et al.

(10) Patent No.: US 12,289,244 B2
(45) Date of Patent: Apr. 29, 2025

(54) SYSTEMS AND METHODS ENABLING TSN/DetNet REPLICATION FUNCTION FALLBACK

(71) Applicant: Telefonaktiebolaget LM Ericsson (publ), Stockholm (SE)

(72) Inventors: Balázs Varga, Budapest (HU); János Farkas, Kecskemét (HU); András Kern, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 519 days.

(21) Appl. No.: 17/624,368

(22) PCT Filed: Jul. 9, 2019

(86) PCT No.: PCT/IB2019/055847
§ 371 (c)(1),
(2) Date: Jan. 3, 2022

(87) PCT Pub. No.: WO2021/005400
PCT Pub. Date: Jan. 14, 2021

(65) Prior Publication Data
US 2022/0360537 A1  Nov. 10, 2022

(51) Int. Cl.
*H04L 47/28* (2022.01)
*H04L 45/24* (2022.01)
*H04L 47/34* (2022.01)

(52) U.S. Cl.
CPC .............. *H04L 47/28* (2013.01); *H04L 45/24* (2013.01); *H04L 47/34* (2013.01)

(58) Field of Classification Search
CPC .... H04L 12/46; H04L 41/0893; H04W 28/02; H04W 48/18
See application file for complete search history.

(56) References Cited

U.S. PATENT DOCUMENTS

2012/0281522 A1  11/2012  Kumar et al.
2013/0114593 A1*  5/2013  Jabr ...................... H04L 49/552
                                                               370/389

(Continued)

OTHER PUBLICATIONS

Author Unknown, "Draft Standard for Local and metropolitan area networks—Frame Replication and Elimination for Reliability," IEEE P802.1CB/D2.4, Jun. 2016, Time-Sensitive Networking Task Group of IEEE 802.1, LAN MAN Standards Committee, IEEE Computer Society, 109 pages.

(Continued)

*Primary Examiner* — Donald L Mills
(74) *Attorney, Agent, or Firm* — Withrow & Terranova, PLLC

(57) ABSTRACT

Systems and methods are disclosed herein that enable Time Sensitive Networking (TSN) network or Deterministic Networking (DetNet) network replication function fallback. In some embodiments, a method comprises, at a primary replication function, obtaining a packet in a particular stream, obtaining a sequence number for the packet, generating M copies of the packet each comprising the sequence number, transmitting the M copies, and providing, to a redundancy controller, the sequence number or a next sequence number of a next packet to be transmitted for the particular stream. The method further comprises, at the redundancy controller, receiving the sequence number or the next sequence number and providing the sequence number or the next sequence number to a secondary replication function. The method further comprises, at the secondary replication function, receiving the sequence number or the next sequence number and configuring a sequence generation function with the next sequence number.

16 Claims, 10 Drawing Sheets

(56) References Cited

U.S. PATENT DOCUMENTS

| | | | | |
|---|---|---|---|---|
| 2014/0029622 | A1* | 1/2014 | Bettink | H04L 47/10 |
| | | | | 370/400 |
| 2015/0365319 | A1* | 12/2015 | Finn | H04L 41/0668 |
| | | | | 370/221 |
| 2018/0324642 | A1* | 11/2018 | Yu | H04W 36/0055 |

OTHER PUBLICATIONS

Author Unknown, "IEEE Standard for Local and metropolitan area networks—Frame Replication and Elimination for Reliability," IEEE Std 802.1CB, 2017, IEEE Computer Society, 102 pages.
International Search Report and Written Opinion for International Patent Application No. PCT/IB2019/055847, mailed Mar. 5, 2020, 19 pages.

* cited by examiner

*FRER functions as per Figure 7-2 of IEEE 802.1CB*

*Changing "GenSeqNum" when BEGIN event occurs in a cold (1+1) redundancy scenario*

Changing "GenSeqNum" when SEQUENCE_CHANGE event occurs in a warm (1+1) redundancy scenario

SYSTEMS AND METHODS ENABLING TSN/DetNet REPLICATION FUNCTION FALLBACK This application is a 35 U.S.C. § 371 national phase filing of International Application No. PCT/IB2019/055847, filed Jul. 9, 2019, the disclosure of which is incorporated herein by reference in its entirety.

TECHNICAL FIELD

The present disclosure relates to a replication function in a Time Sensitive Networking (TSN) network or a Deterministic Network (DetNet).

BACKGROUND

Time Sensitive Networking (TSN) is currently being developed at the Institute of Electrical and Electronics Engineers (IEEE) as a new technology that enhances IEEE 802.1 and IEEE 802.3 Ethernet standards to an entirely new level of determinism. TSN can be seen as an evolution of Ethernet to guarantee low end-to-end latency, low jitter, and low packet loss.

The TSN Task Group (TG) within the IEEE 802.1 Working Group (WG) deals with deterministic services through IEEE 802 networks. The TSN TG specifies the tools of the TSN toolbox, as well as the use of the tools for a particular purpose. The TSN TG is chartered to provide deterministic services through IEEE 802 networks with:
  guaranteed packet transport,
  low packet loss,
  bounded low latency, and
  low packet delay variation.

In order to achieve extremely low packet loss, the TSN TG specified Frame Replication and Elimination for Reliability (FRER) (see IEEE 802.1CB). FRER is targeted to avoid frame loss due to equipment failure. FRER is practically a per-frame 1+1 (or 1+n) redundancy function. There is no failure detection or switchover incorporated into FRER. In FRER, a replication point sends frames of a particular stream on two (or more) maximally disjoint paths. An elimination point then combines the resulting replicated streams (sometimes referred to herein as "member streams") received over at least some (but potentially all) of the disjoint paths and deletes an extra frame.

Note that the same functions are defined for Deterministic Networking (DetNet) networks as Packet Replication and Elimination Functions (PREFs) in order to simplify implementation and allow use of the same concept in both Layer2 (TSN) and Layer3 (DetNet) networks. The discussion herein focuses on FRER but is equally applicable to PREF.

IEEE 802.1CB states that:
  [T]his standard defines Frame Replication and Elimination for Reliability (FRER), which divides a Stream into one or more linked Member Streams, thus making the original Stream a Compound Stream. It replicates the packets of the Stream, splitting the copies into the multiple Member Streams, and then rejoins those Member Streams at one or more other points, eliminates the replicates, and delivers the reconstituted Stream from those points.

FRER uses a replication function and an elimination function. The replication function may, for example, be implemented in a first TSN bridge in a communication path through the TSN network from a first TSN endpoint (referred to as a "Talker") to a second TSN endpoint (referred to as a "Listener"). The elimination function may, for example, be implemented in a last TSN bridge in the communication path (i.e., the TSN bridge closest to the second TSN endpoint). The replication function receives a Stream from the first TSN endpoint and replicates the packets in the Stream to provide multiple Member Streams (each being a copy of Stream). The Member Streams are transmitted through the TSN network via disjoint paths. At the elimination function, depending on conditions within the TSN network, one or more of the Member Streams are received (potentially all of the Member Streams are received if none of the paths have failed). The elimination function processes the received packets to discard duplicate packets.

More specifically, for each received packet received for each of the Member Streams, the elimination function evaluates the "sequence_number" sub-parameter of the packet passed up from the lower layers in order to discard duplicated packets. For this purpose, a "SequenceHistory" variable maintains a history of the "sequence_number" sub-parameters of recently received packets. In addition, a history window is defined by a "frerSeqRcvyHistoryLength" parameter. The "sequence_number" of the received packet is first compared to the history window (e.g., a history window where a central point of the history window corresponds to a last received "sequence_number" and a length of the window corresponds to "frerSeqRcvyHistoryLength"). If the "sequence_number" of the received packet is outside of the history window, the packet is discarded. Otherwise, if the "sequence_number" of the packet is within the history window, the elimination function checks to see if the "sequence_number" is already included in the "SequenceHistory". If so, the received packet is determined to be a duplicate packet and is therefore discarded. Otherwise, the received packet is determined to be a new packet. Therefore, the "sequence_number" of the packet is added to the "SequenceHistory", the history window is updated based on the "sequence_number" of the packet, and the packet is passed to the second TSN endpoint. This process continues for each packet received for any of the Member Streams.

IEEE 802.1CB also defines a timeout mechanism for the elimination function in order to cope with some networking scenarios that results in unnecessarily dropped frames (e.g., if the elimination function somehow gets out of step with its corresponding Sequence generation function; if a Sequence generation function is reset; etc.). If a timeout occurs before receiving a packet from any of the Member Streams that has a "sequence_number" that is within the history window, the "SequenceHistory" and the history window are reset, and the elimination function is allowed to accept the next packet received for any of the Member Streams, regardless of the value of its "sequence_number" sub-parameter. Once this next packet is received, its "sequence_number" is added to the "SequenceHistory" and the history window is updated accordingly.

"Sequence_number" is an essential sub-parameter of a packet for FRER functions to work properly. In particular, "sequence_number" allows the elimination function to identify and discard duplicate packets. At the replication node, a sequencing function, and in particular a sequence generation component function of the sequencing function, supplies sequential values for the "sequence_number" sub-parameter. At the elimination node, a sequencing function, and in particular a sequence recovery component function of the sequencing function, uses the "sequence_number" values to discard duplicate packets.

More specifically, both the replication node and the elimination node include a sequencing function. The sequencing function has two kinds of component functions, namely, a sequence generation function and a sequence recovery function. At the replication node, the sequence generation function operates on packets passed down the protocol stack towards the physical layer and generates a value for the "sequence_number" sub-parameter for those packets. At the elimination node, the sequence recovery function operates on packets passed up the stack towards the higher layer functions and uses the "sequence_number" sub-parameter to decide which packets to pass and which to discard. FIG. 1 illustrates FRER functions as per FIG. 7-2 of IEEE 802.1CB.

On any given port, zero or more instances of the sequence generation function and/or sequence recovery function can be instantiated. Each instance of the sequence generation function has its own set of variables, independent from any other instance. These variables include:

"GenSeqSpace": The "GenSeqSpace" variable specifies the range of values for the "sequence_number" sub-parameter and other variables that depend on it. It is a constant with the value 65 536.

"GenSeqNum": The "GenSeqNum" variable contains the value that the sequence generation function increments after passing down to the lower layer as the "sequence_number" sub-parameter. The variable is an unsigned integer in the range 0 to (GenSeqSpace−1). "GenSeqNum" is initialized to 0 whenever the function is reset, and is incremented by 1 after its value is copied to the "sequence_number" sub-parameter. When incremented past its maximum value, the new value is 0.

"SequenceGenerationReset": The "SequenceGenerationReset" function is called whenever a "resets all FRER functions event" or a management order occurs. It resets "GenSeqNum" (sets its value to 0).

The current IEEE 802.1CB standard assumes a single replication point in the end-to-end TSN network to implement the "sequence generation" function for a TSN stream. This single replication point is the first replication point through which the TSN stream passes, which is usually located close to the Talker. All other FRER nodes use the "sequence decode" function to determine the "sequence_number" sub-parameter of the received packets. Such an architecture inherits a single point of failure, namely the first replication point.

High availability systems require that there be no single point of failure. Therefore, FRER functions (i.e., sequence generation) must be improved to be able to support various redundancy solutions.

SUMMARY

Systems and methods are disclosed herein that enable a Time Sensitive Networking (TSN) network or a Deterministic Networking (DetNet) network replication function fallback. In some embodiments, a method performed by a system for replication in a TSN network or a DetNet network comprises, at a primary replication function, obtaining a packet in a particular stream of packets; obtaining, by a sequence generation function of the primary replication function, a sequence number for the packet in the particular stream of packets; generating M copies of the packet for the particular stream of packets, each copy of the packet comprising the sequence number generated by the sequence generation function; transmitting the M copies of the packet via M respective paths through the TSN network or the DetNet network; and providing, to a redundancy controller, the sequence number or a next sequence number of a next packet to be transmitted for the particular stream of packets. The method further comprises, at the redundancy controller, receiving, from the primary replication function, the sequence number or the next sequence number of the next packet to be transmitted for the particular stream of packets; and providing the sequence number or the next sequence number of the next packet to a secondary replication function for the particular stream, the primary replication function and the secondary replication function being redundant replication functions for the particular stream of packets. The method further comprises, at the secondary replication function, receiving, from the redundancy controller, the sequence number or the next sequence number of the next packet; and, based on the sequence number or the next sequence number of the next packet received from the redundancy controller, configuring a sequence generation function of the secondary replication function with the next sequence number for the next packet in the particular stream of packets.

Embodiments of a secondary replication function and corresponding embodiments of a node that implements a secondary replication function are also disclosed. In some embodiments, a method of operation of a secondary replication function for a particular stream of packets in a TSN network or a DetNet network comprises receiving, from a redundancy controller, a sequence number inserted into a last packet replicated and transmitted by a primary replication function for the particular stream of packets or a next sequence number for a next packet to be transmitted for the particular stream of packets. The method further comprises, based on the sequence number or the next sequence number, configuring a sequence generation function of the secondary replication function with the next sequence number for the next packet to be transmitted for the particular stream of packets. In this manner, fallback from the primary replication function to the secondary replication function is enabled.

In some embodiments, receiving the sequence number or the next sequence number comprises receiving the sequence number or the next sequence number during a cold-start of the secondary replication function for the particular stream of packets, and configuring the sequence number generation function comprises initializing the sequence generation function of the secondary replication function with the next sequence number. In some embodiments, the TSN network or the DetNet network is a TSN network, and initializing the sequence generation function of the secondary replication function with the next sequence number comprises configuring a GenSeqNum parameter utilized by the sequence generation function of the secondary replication function with the next sequence number in association with a BEGIN event. In some embodiments, the method further comprises obtaining a next packet in the particular stream of packets; obtaining, by the sequence generation function of the secondary replication function, the next sequence number for the next packet in the particular stream of packets; generating M copies of the next packet for the particular stream of packets, each copy of the next packet comprising the next sequence number obtained by the sequence generation function; and transmitting the M copies of the next packet via M respective paths through the TSN network or the DetNet network.

In some embodiments, receiving the sequence number or the next sequence number comprises receiving the sequence number or the next sequence number during a state synchronization procedure between the primary replication function and the secondary replication function, and configuring the sequence generation function comprises configuring the sequence generation function of the secondary replication function with the next sequence number in association with the state synchronization procedure. In some embodiments, the TSN network or the DetNet network is a TSN network, and configuring the sequence generation function of the secondary replication function with the next sequence number in association with the state synchronization procedure comprises configuring a GenSeqNum parameter utilized by the sequence generation function of the secondary replication function with the next sequence number in association with a SEQUENCE_CHANGE event. In some embodiments, the method further comprises obtaining a next packet in the particular stream of packets; obtaining, by the sequence generation function of the secondary replication function, the next sequence number for the next packet in the particular stream of packets; and generating M copies of the next packet for the particular stream of packets, each copy of the next packet comprising the next sequence number obtained by the sequence generation function. In some embodiments, the method further comprises receiving, from the redundancy controller, a trigger to activate output of the secondary replication function; and transmitting the M copies of the next packet via M respective paths through the TSN network or the DetNet network responsive to receiving the trigger to activate the output of the secondary replication function.

In some embodiments, a network node implements a secondary replication function for a particular stream of packets in a TSN network or a DetNet network. The secondary replication function is adapted to receive, from a redundancy controller, a sequence number inserted into a last packet replicated and transmitted by a primary replication function for the particular stream of packets or a next sequence number for a next packet to be transmitted for the particular stream of packets. The replication function is further adapted to, based on the sequence number or the next sequence number, configure a sequence generation function of the secondary replication function with the next sequence number for the next packet to be transmitted for the particular stream of packets.

In some embodiments, the network node comprises a network interface and processing circuitry associated with the network interface. The processing circuitry is adapted to cause the network node to implement the secondary replication function.

Embodiments of method of operation of a primary replication function and corresponding embodiments of a node implementing the primary replication function are also disclosed. In some embodiments, a method of operation of a primary replication function for a particular stream of packets in a TSN network or a DetNet network comprises obtaining a packet in a particular stream of packets and obtaining, by a sequence generation function of the primary replication function, a sequence number for the packet in the particular stream of packets. The method further comprises generating M copies of the packet for the particular stream of packets, each copy of the packet comprising the sequence number generated by the sequence generation function, and transmitting the M copies of the packet via M respective paths through the TSN network or the DetNet network. The method further comprises providing, to another network entity, the sequence number or a next sequence number for a next packet in the particular stream of packets.

In some embodiments, the method further comprises obtaining a next packet in a particular stream of packets and obtaining, by the sequence generation function of the primary replication function, the next sequence number for the next packet in the particular stream of packets. The method further comprises generating M copies of the next packet for the particular stream of packets, each copy of the next packet comprising the next sequence number obtained by the sequence generation function, and transmitting the M copies of the next packet via the M respective paths through the TSN network or the DetNet network. The method further comprises providing, to the other network entity, the next sequence number or a sequence number of a packet following the next packet in the particular stream of packets.

In some embodiments, the other network entity is a redundancy controller.

In some embodiments, a network node implements a primary replication function for a particular stream of packets in a TSN network or a DetNet network, where the primary replication function is adapted to obtain a packet in a particular stream of packets and obtain, by a sequence generation function of the primary replication function, a sequence number for the packet in the particular stream of packets. The primary replication function is further adapted to generate M copies of the packet for the particular stream of packets, each copy of the packet comprising the sequence number generated by the sequence generation function, and transmit the M copies of the packet via M respective paths through the TSN network or the DetNet network. The primary replication function is further adapted to provide, to another network entity, the sequence number or a next sequence number for a next packet to be transmitted for the particular stream of packets.

In some embodiments, the network node comprises a network interface and processing circuitry associated with the network interface. The processing circuitry is adapted to cause the network node to implement the primary replication function.

Embodiments of a method of operation of a redundancy controller and corresponding embodiments of a network node that implements a redundancy controller are also disclosed. In some embodiments, a method of operation of a redundancy controller in a TSN network or a DetNet network comprises obtaining, from a primary replication function for a particular stream of packets in the TSN network or the DetNet network, a sequence number inserted into a last packet replicated and transmitted by the primary replication function for the particular stream or a next sequence number for a next packet to be transmitted for the particular stream of packets. The method further comprises providing the sequence number or the next sequence number to a secondary replication function for the particular stream. The primary replication function and the secondary replication function are redundant replication functions for the particular stream of packets.

In some embodiments, providing the sequence number or the next sequence number to the secondary replication function comprises providing the sequence number or the next sequence number to the secondary replication function during a cold-start of the secondary replication function for the particular stream of packets.

In some embodiments, providing the sequence number or the next sequence number to the secondary replication function comprises providing the sequence number or the next sequence number to the secondary replication function during a state synchronization procedure between the primary replication function and the secondary replication function. In some embodiments, the method further comprises providing a trigger to the primary replication function to deactivate an output of the primary replication function for the next packet and a trigger to the secondary replication function to activate an output of the secondary replication function for the next packet.

In some embodiments, a network node implements a redundancy controller for a particular stream of packets in a TSN network or a DetNet network, where the redundancy controller is adapted to obtain, from a primary replication function for a particular stream of packets in the TSN network or the DetNet network, a sequence number inserted into a last packet replicated and transmitted by the primary replication function for the particular stream or a next sequence number for a next packet to be transmitted for the particular stream of packets. The redundancy controller is further adapted to provide the sequence number or the next sequence number to a secondary replication function for the particular stream, the primary replication function and the secondary replication function being redundant replication functions for the particular stream of packets.

In some embodiments, the network node comprises a network interface and processing circuitry associated with the network interface. The processing circuitry is adapted to cause the network node to implement the redundancy controller.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
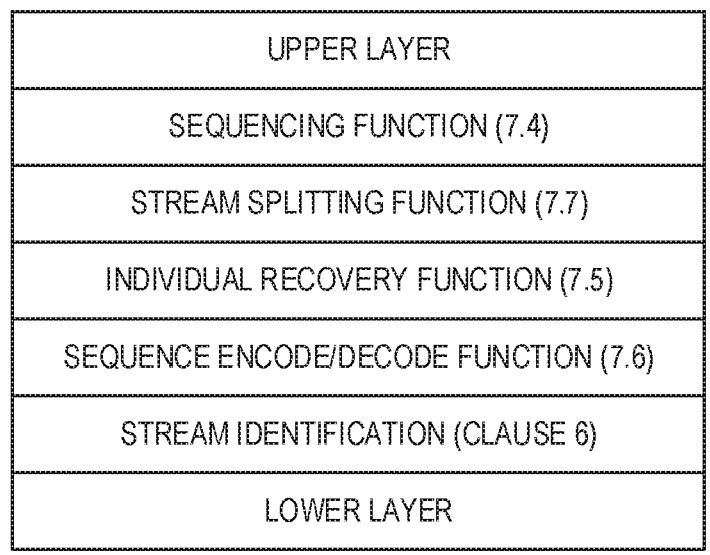
FIG. 1 illustrates Frame Replication and Elimination for Reliability (FRER) functions as per FIG. 7-2 of the Institute for Electrical and Electronics Engineers (IEEE) 802.1CB specification.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

TSN Node: As used herein, a Time Sensitive Networking (TSN) node is any network node in a TSN network. Examples of a TSN node include a TSN endpoint and a TSN bridge.

Systems and methods are disclosed herein for improving the replication function, and more specifically the sequence generation function, in a TSN network using Frame Replication and Elimination for Reliability (FRER) in accordance with Institute of Electrical and Electronics Engineers (IEEE) 802.1CB (or likewise in a Deterministic Networking (DetNet) network using Packet Replication and Elimination Functions (PREFs). Note that the discussion herein uses IEEE 802.1CB terminology and variable names where appropriate, denoted as "VariableName". New variables, functions, and parameters follow IEEE 802.1CB naming conventions and are denoted as "NewEntityName".

The current IEEE 802.1CB standard assumes a single replication point in the end-to-end TSN network to implement the "sequence generation" function for a TSN stream. This single replication point is the first replication point through which the TSN stream passes, which is usually located close to the Talker. All other FRER nodes use the "sequence decode" function to determine the "sequence_number" sub-parameter of the received packets. Such an architecture inherits a single point of failure, namely the first replication point.

High availability systems require that there be no single point of failure. Therefore, FRER functions (i.e., sequence generation) must be improved to be able to support various redundancy solutions. However, the existing solution prohibits the usage of some widely used redundancy solutions. Two example redundancy solutions used in Cloud environments that are blocked by the existing solution are: (i) virtualization of the Talker and the first replication point and (ii) using clustering technologies. The main issue that blocks the use of these redundancy solutions is that the existing IEEE 802.1CB specification does not allow: modification of the "GenSeqNum" value during the sequence decode reset (i.e., "SequenceGenerationReset" as per section 7.4.1.3 of IEEE 802.1CB) routine, or change of the "GenSeqNum" value without packets processed (i.e., a DATA_REQUEST event as per section 7.4.1.1 of IEEE 802.1CB).

Systems and methods are disclosed herein that allow free modification of the "GenSeqNum" parameter (i.e., modification of the "GenSeqNum" parameter (also referred to herein as a "variable") to any value (e.g., any value within a permissible range of values)) in a TSN network, which is essential for the above-mentioned redundancy solutions. There are at least two scenarios where changing the "GenSeqNum" parameter to a configurable value is beneficial, namely:

1. during the start of FRER functions, and
2. during state synchronization of "sequence generation" functions belonging to other entities.

These improvements are essential for extending FRER usage inside the Cloud domain. They allow integration of transport (i.e., FRER) and Cloud specific redundancy technologies. For example, they allow protection (i) via virtualization of the Talker and the first replication point or (ii) via clustering technologies. As a basic building block, the improvements can be used in other cases as well.

Figure 2:
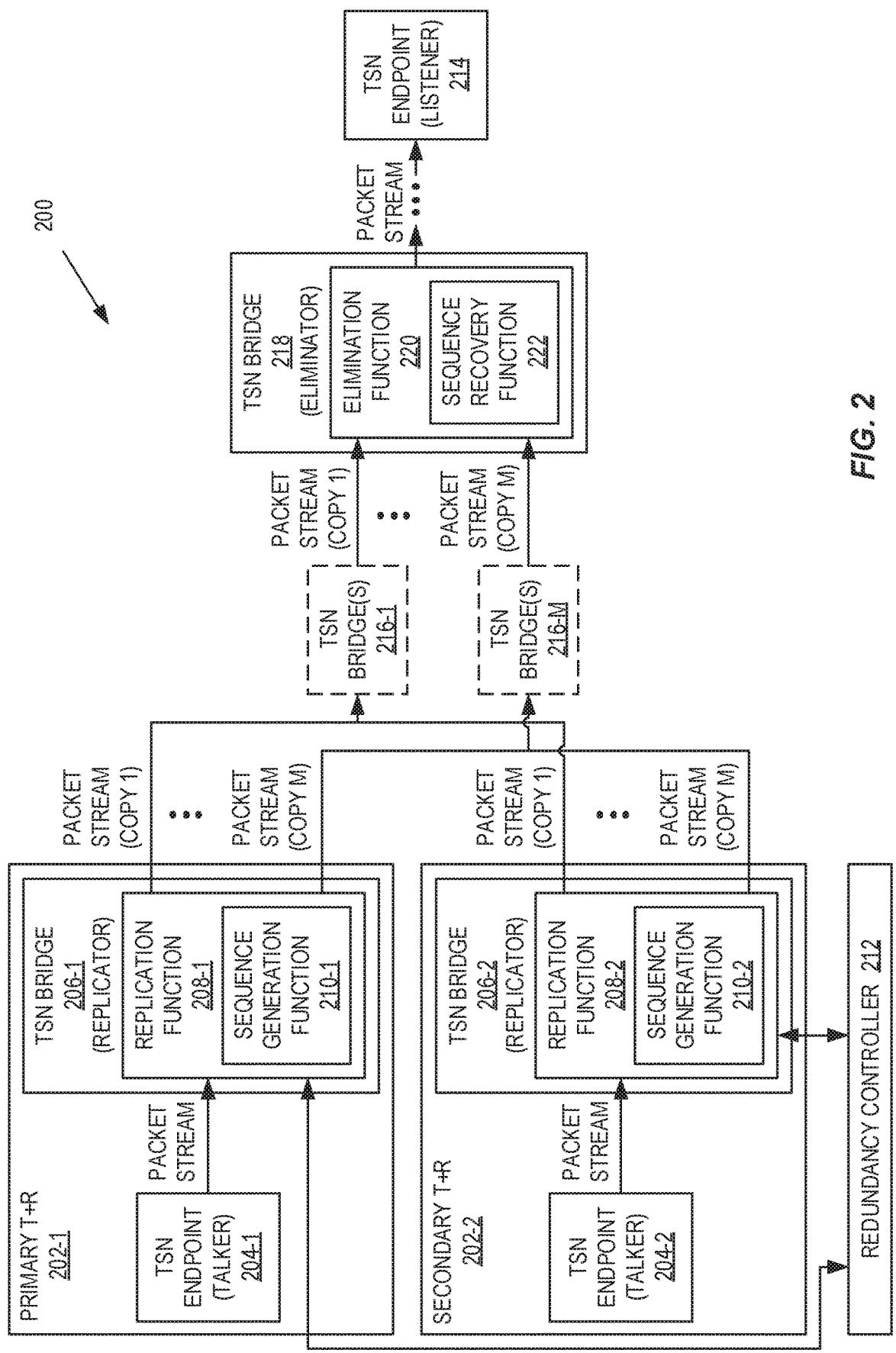
FIG. 2 illustrates one example of a Time Sensitive Networking (TSN) network in which embodiments of the present disclosure may be implemented.

In this regard, FIG. 2 illustrates one example of a TSN network 200 in which embodiments of the present disclosure may be implemented. Note that while the TSN network 200 is shown as an example, a similar architecture applies for a DetNet network. As illustrated, the TSN network 200 utilizes redundancy to eliminate a single replication point as a single point of failure by including a set of redundant replication points. In this example, this redundancy is achieved by the TSN network 200 including a primary Talker and Replication (T+R) entity 202-1 and a secondary T+R entity 202-2, which implement a redundancy mechanism with respect to generation, replication, and transmission of a particular TSN stream. Note that the terms "primary" and "secondary" are used herein merely to differentiate the two T+R entities 202-1 and 202-2 and should not be interpreted otherwise.

The primary T+R entity 202-1 includes a TSN endpoint 204-1, which is also referred to as the "Talker", and a TSN bridge 206-1 including a replication function 208-1 which itself includes a sequence generation function 210-1. In a similar manner, the secondary T+R entity 202-2 includes a TSN endpoint 204-2, which is also referred to as the "Talker", and a TSN bridge 206-2 including a replication function 208-2 which itself includes a sequence generation function 210-2.

As discussed below, in some embodiments, a cold backup mechanism is implemented such that, e.g., the secondary T+R entity 202-2 is implemented as a virtual machine(s) or virtual function(s) that is(are) instantiated when, for some reason (e.g., failure, load sharing, etc.), it is desired for the secondary T+R entity 202-2 to generate and output the particular TSN stream instead of the primary T+R entity 202-1, or vice versa. In some other embodiments, a warm backup mechanism is implemented in which both the primary T+R entity 202-1 and the secondary T+R entity 202-2 are both operating at the same time (i.e., in parallel) but controlled by a redundancy controller 212 such that only one of the T+R entities 202 output the TSN stream at any given time.

In operation, either the primary T+R entity 202-1 or the secondary T+R entity 202-2 generates the particular TSN stream, replicates the TSN stream to provide M copies of the TSN stream, and transmits the M copies of the TSN stream over different paths through the TSN network 200 to a desired TSN endpoint 214. More specifically, as an example, when the redundancy controller 212 configures the primary T+R entity 202-1 and the secondary T+R entity 202-2 such that the primary T+R entity 202-1 generates and outputs the TSN stream, the TSN endpoint 204-1 generates the TSN stream (i.e., a stream of packets) and outputs the TSN stream to the TSN bridge 206-1. At the TSN bridge 206-1, the replication function 208-1 replicates the TSN stream to provide a number (M) of TSN streams (referred to as COPY 1, . . . , COPY M or likewise Member Stream 1, . . . , Member Stream M). More specifically, the sequence generation function 210-1 operates to generate sequence numbers for the packets in the TSN stream. For each packet in the TSN stream, the replication function 208-1 inserts a respective sequence number (generated by the sequence generation function 210-1) into the packet, replicates the resulting packet to provide M copies of the packet, and transmits the M copies of the packet to the TSN endpoint 214 over disjoint paths through the TSN network 200. This process is repeated for each received packet, resulting in the M copies of the packet stream that are transmitted via the M disjoint paths.

Each m-th copy of the TSN stream (where m={1, . . . , M}) optionally traverses one or more intermediate TSN bridges 216-*m* before arriving at a TSN bridge 218, which operates as an elimination point (or "Eliminator") for the TSN stream. In this example, the TSN bridge 218 is either connected directly to the TSN endpoint 214 or connected to the TSN endpoint 214 via one or more additional TSN nodes (e.g., one or more additional TSN bridges, which are not shown). As illustrated, the TSN bridge 218 includes an elimination function 220. The elimination function 220 receives the M copies of the packet stream (assuming that none of the disjoint paths have failed) and operates to discard duplicate or invalid packets before sending a resulting TSN stream to the TSN endpoint 214. More specifically, a sequence recovery function 222 of the elimination function 220 operates on packets passed up the protocol stack towards the higher layer functions and uses the sequence number sub-parameter to decide which packets to pass and which to discard.

Embodiments of the present disclosure enable modification of the "GenSeqNum" parameter to any value (within the range 0 to (GenSeqSpace−1)). Note that while the terms "GenSeqNum" and "GenSeqSpace" are used herein when describing example embodiments of the present disclosure implemented in a TSN network in accordance with IEEE 802.1CB, the present disclosure is not limited thereto. As such, it is to be understood that these terms are only examples and that the embodiments described herein are more generally applicable to modification of the sequence number at a replication point in any TSN or DetNet network.

The current IEEE 802.1CB specification changes the "GenSeqNum" parameter whenever the "BEGIN" event occurs or via management (i.e., True is written to the "frerSeqRcvyReset" managed object). In such cases the "GenSeqNum" value is reset to zero. Furthermore, according to IEEE 802.1CB, the "GenSeqNum" parameter is changed whenever the "DATA_REQUEST" (item b in Section 7.4.1.1 of IEEE 802.1CB) event occurs (i.e., a packet from the upper layer has to be processed by the sequence generation function). In such cases, "GenSeqNum" is incremented by one.

In some embodiments of the present disclosure, the "GenSeqNum" value can be modified to any value within the range of 0 to "GenSeqSpace"−1. In some embodiments, this can be done in at least the following two scenarios where change of "GenSeqNum" to a configurable value is beneficial:
1. "BEGIN" event: The BEGIN event is the global event that resets all FRER functions, and
2. "SEQUENCE_CHANGE" event: The SEQUENCE_CHANGE event is an event that may occur anytime and changes the "GenSeqNum" to a defined value.

The "BEGIN" event is already defined in IEEE 802.1CB (Section 7.4.3.1). However, currently, the BEGIN event resets "GenSeqNum" to 0. In one embodiment, the BEGIN event is modified to allow "GenSeqNum" to be set to any value within the range of 0 to "GenSeqSpace"−1. The "SEQUENCE_CHANGE" event is a new event proposed herein. The SEQUENCE_CHANGE event can be triggered via external entities or via management. In such cases, "GenSeqNum" is set to any value within the range of 0 to "GenSeqSpace"−1.

Two possible use cases are described below, namely:
Use Case #1: Changing "GenSeqNum" when BEGIN event occurs in a cold (1+1) backup scenario, and
Use Case #2: Changing "GenSeqNum" when SEQUENCE_CHANGE event occurs in a warm (1+n) backup scenario.

Use Case #1

In Use Case #1, the value of "GenSeqNum" is modified to a desired value (i.e., any desired value in the range of 0 to "GenSeqSpace"−1) when a BEGIN event occurs. This scenario is described for a system with 1+1 cold backup redundancy. Cold backup means that if the primary system fails (e.g., if the primary T+R entity 102-1 fails), then a new secondary system (i.e., the secondary T+R entity 102-2) is set up to continue operation. In the example below, the Talker (i.e., the TSN endpoint 104-1) and the replication function instance (i.e., the replication function 208-1 of the TSN bridge 206-1) are implemented within the same entity; however, the present disclosure is not limited thereto.

For the cold (1+1) backup scenario, an application is served in the cloud by a single combined "T+R" instance (i.e., the primary T+R entity 202-1). When this instance fails, a new "T+R" instance (i.e., the secondary T+R entity 202-2) is set up in the cloud to provide redundancy for the given application (cold backup). For smooth switch-over to the new "T+R" instance, the state of the new T+R instance is synchronized with the failed T+R instance. The "GenSeqNum" parameter is matched during the start of the replication function (i.e., the replication function 208-1). This allows the usage of the existing configuration of FRER nodes towards the Listener(s) and does not require the configuration change of those nodes.

Figure 3A:
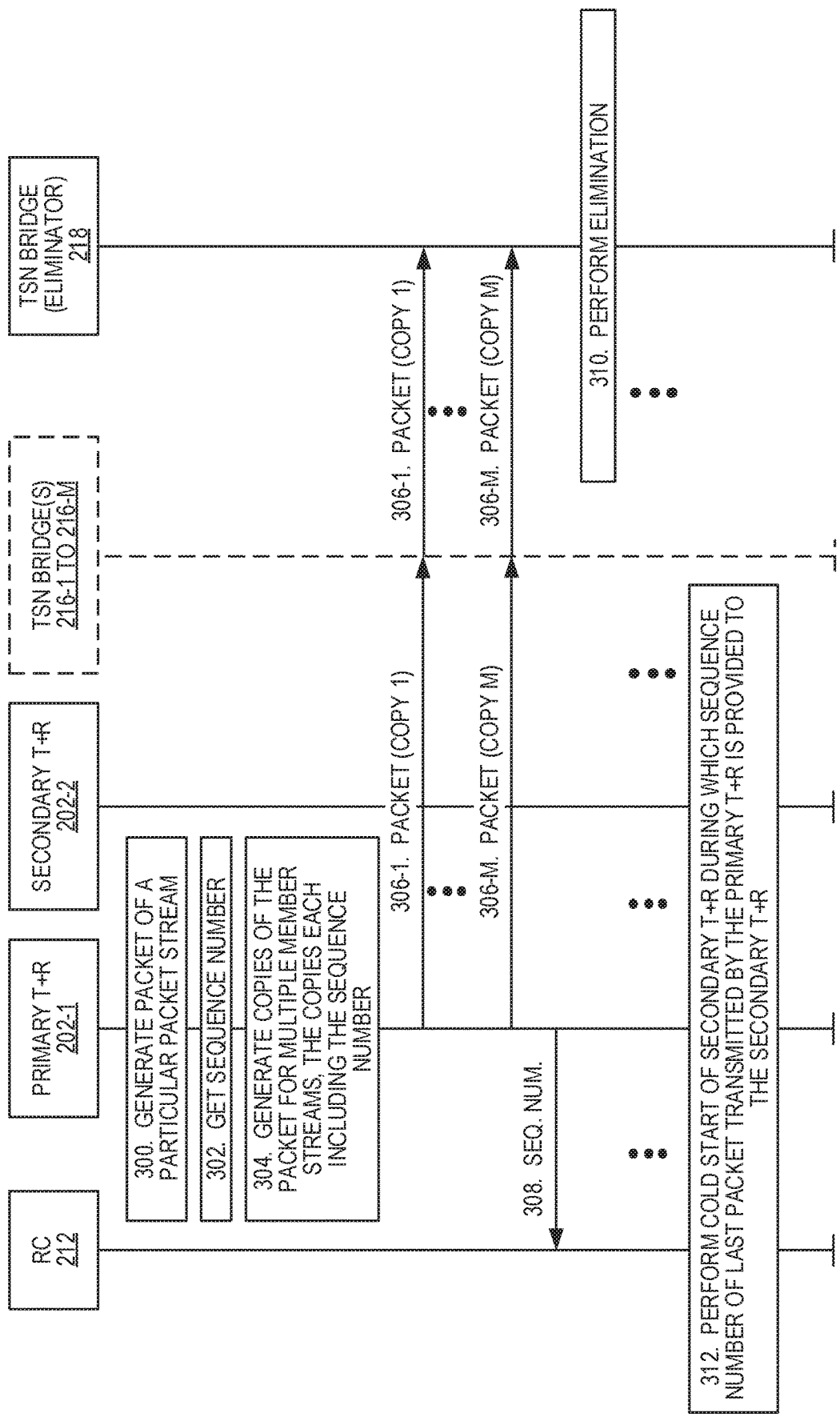
FIGS. 3A and 3B illustrate the operation of the TSN network in accordance with some embodiments of the present disclosure.
Figure 3B:
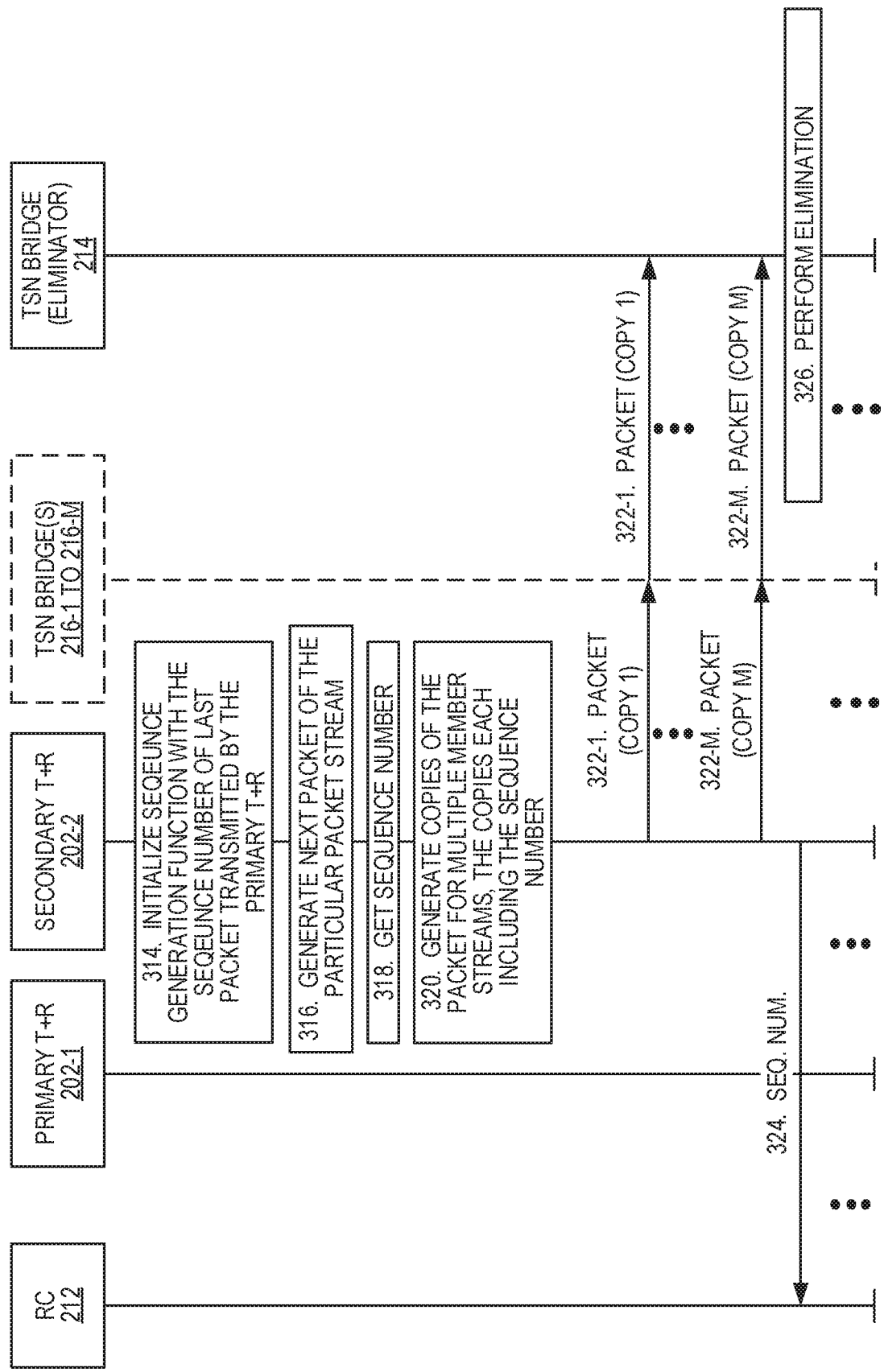

In this regard, FIGS. 3A and 3B illustrate the operation of the TSN network 200 to provide cold (1+1) backup of the primary T+R entity 202-1 in accordance with some embodiments of the present disclosure. As illustrated, the primary T+R entity 202-1, and in particular the TSN endpoint 104-1, generates a packet of a particular packet stream (also referred to herein as a TSN stream) (step 300). The primary T+R entity 202-1, and in particular the sequence generation function 210-1, gets a sequence number for the packet (step 302). The primary T+R entity 202-1, and in particular the replication function 108-1, generates M copies of the packet for M copies of the packet stream (also referred to herein as Member Streams) (step 304). Each of the M copies of the packet include the sequence number from step 302. The primary T+R entity 202-1, and in particular the replication function 208-1, transmits the M copies of the packet over M different paths through the TSN network 200 (steps 306-1 through 306-M). In addition, in this example, the primary T+R entity 202-1, and in particular the replication function 208-1, sends, to the redundancy controller 212, an indication of either the sequence number of the packet or a sequence number of a next packet to be transmitted for the particular stream (step 308). For example, the replication function 208-1 sends its "GenSeqNum" value, which at this point is equal to the sequence number to be used for the next packet to be transmitted for the particular stream.

Some or all of the M copies of the packet are ultimately received by the TSN bridge 218, where the elimination function 220 uses the sequence number contained in the copies of the packet to perform an elimination procedure that discards duplicate packets (step 310). After elimination, the resulting packet stream is transmitted to the TSN endpoint 214.

The process continues in this manner such that packets for the packet stream are generated, replicated, and transmitted by the primary T+R entity 202-1. Each time a new packet is transmitted, the primary T+R entity 202-1 sends the corresponding sequence number to the redundancy controller 212.

At some point, the primary T+R entity 202-1 fails or there is otherwise a desire to activate the secondary T+R entity 102-2. At this point, the redundancy controller 212 performs (e.g., triggers) a cold start of the secondary T+R entity 202-1 (step 312). During cold start, the redundancy controller 312 sends, to the secondary T+R entity 202-2, either the sequence number of the last packet transmitted by the primary T+R entity 202-1 or the sequence number of the next packet to be transmitted for the particular stream (i.e., the next sequence number following the sequence number of the last packet transmitted by the primary T+R entity 202-1).

At the secondary T+R entity 202-2, a BEGIN event is triggered. When the BEGIN event occurs, the sequence generation function 210-2 is configured with the sequence number of the next packet to transmitted by the secondary T+R entity 202-1 for the particular stream, based on the information received from the redundancy controller 212 in step 312 (step 314). In particular, the "GenSeqNum" value is set to the sequence number of the next packet to be transmitted for the particular stream. After cold start, the secondary T+R entity 202-2, and in particular the TSN endpoint 104-2, generates a next packet of the particular packet stream (step 316). The secondary T+R entity 202-2, and in particular the sequence generation function 210-2, gets the sequence number for the next packet (step 318). Because the sequence generation function 210-2 has been configured by setting the "GenSeqNum" value to the sequence number of the next packet to be transmitted for the particular stream (rather than resetting "GenSeqNum" to 0), the sequence number generated for the next packet is the next expected sequence number for the stream. The secondary T+R entity 202-2, and in particular the replication function 108-2, generates M copies of the next packet for the M copies of the packet stream (step 320). Each of the M copies of the packet include the sequence number from step 318. The secondary T+R entity 202-2, and in particular the replication function 208-2, transmits the M copies of the next packet over M different paths through the TSN network 200 (steps 322-1 through 322-M). In addition, in this example, the secondary T+R entity 202-2, and in particular the replication function 208-2, sends the sequence number of this next packet or the sequence number of the following packet to the redundancy controller 212 (step 324).

Some or all of the M copies of the next packet are ultimately received by the TSN bridge 218, where the elimination function 220 uses the sequence number contained in the copies of the packet to perform an elimination procedure that discards duplicate packets (step 326). After elimination, the resulting packet stream is transmitted to the TSN endpoint 214.

The process continues in this manner such that packets for the packet stream are generated, replicated, and transmitted by the secondary T+R entity 202-2. Each time a new packet is transmitted, the secondary T+R entity 202-2 sends the corresponding sequence number or the next sequence number to the redundancy controller 212. Thus, in some scenarios, if the secondary T+R entity 102-2 fails (or activation of another T+R entity is desired), the redundancy controller 212 can provide the sequence number of the last packet transmitted by the secondary T+R entity 202-2 or the next sequence number for the particular stream to another T+R entity during a cold start of that T+R entity. In this manner, this T+R entity can be started such that its sequence generation function is configured with the correct sequence number.

Figure 4:
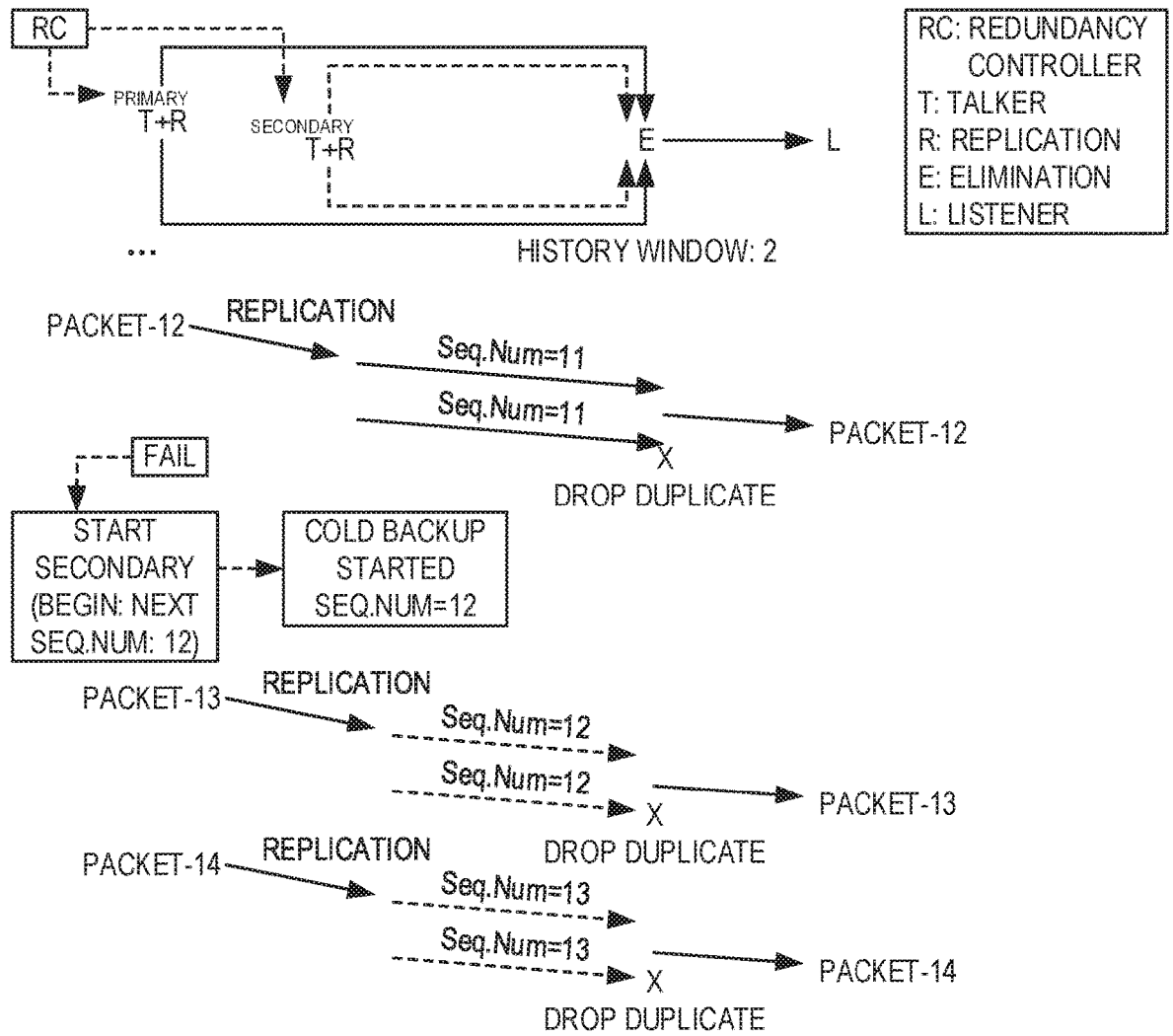
FIG. 4 illustrates one example of changing the "GenSeqNum" when a BEGIN event occurs in a cold (1+1) redundancy scenario.

FIG. 4 illustrates one example of changing the "GenSeqNum" when a BEGIN event occurs in a cold (1+1) redundancy scenario. As illustrated, the primary T+R entity 202-1 replicates Packet-12 and transmits two copies of Packet-12, each containing Seq.Num=11. While not illustrated, the primary T+R entity 202-1 provides either the sequence number (Seq.Num=11) of this packet or the sequence number (Seq.Num=12) of the next packet to the redundancy controller (RC) 212. Thereafter, the primary T+R entity 202-1 fails, and the redundancy controller 212 starts the secondary T+R entity 202-2 and provides, to the secondary T+R entity 202-2, either the sequence number (Seq.Num=11) of the packet last packet transmitted by the primary T+R entity 202-1 or the sequence number (Seq.Num=12) of the next packet to be transmitted for the stream. At the secondary T+R entity 202-2, a BEGIN event occurs, and the replication function 208 is configured with the next sequence number (Seq.Num=12) to be used for the stream (e.g., by setting "GenSeqNum" equal to 12). The secondary T+R entity 202-2 replicates the next packet (Packet-12) and transmits two copies of Packet-12, each including Seq.Num=12, and the process continues.

Use Case #2

In Use Case #2, the value of "GenSeqNum" is modified to a desired value (i.e., any desired value in the range of 0 to "GenSeqSpace"–1) when a SEQUENCE_CHANGE event occurs. This scenario is described for a system with 1+n warm backup redundancy. Warm backup means that all systems construct the packet to be sent and the redundancy controller 212 selects which one really sends the next packet. All other systems remain silent (i.e., do not send the packet). In the examples below, the Talker and the FRER instance (i.e., the replication function 208 instance) are implemented within the same entity; however, the present disclosure is not limited thereto.

In the warm (1+n) backup scenario, an application is served in the cloud by multiple combined "T+R" instances. Redundancy is provided by a control entity (i.e., the redundancy controller 212) which selects which instance of the application (Talker) should generate the application packets for the Listener(s). As the FRER setup of the Transport domain requires incremental packets, the "GenSeqNum" parameters of the "T+R" instances are synchronized in order to avoid drop of application packets.

Figure 5A:
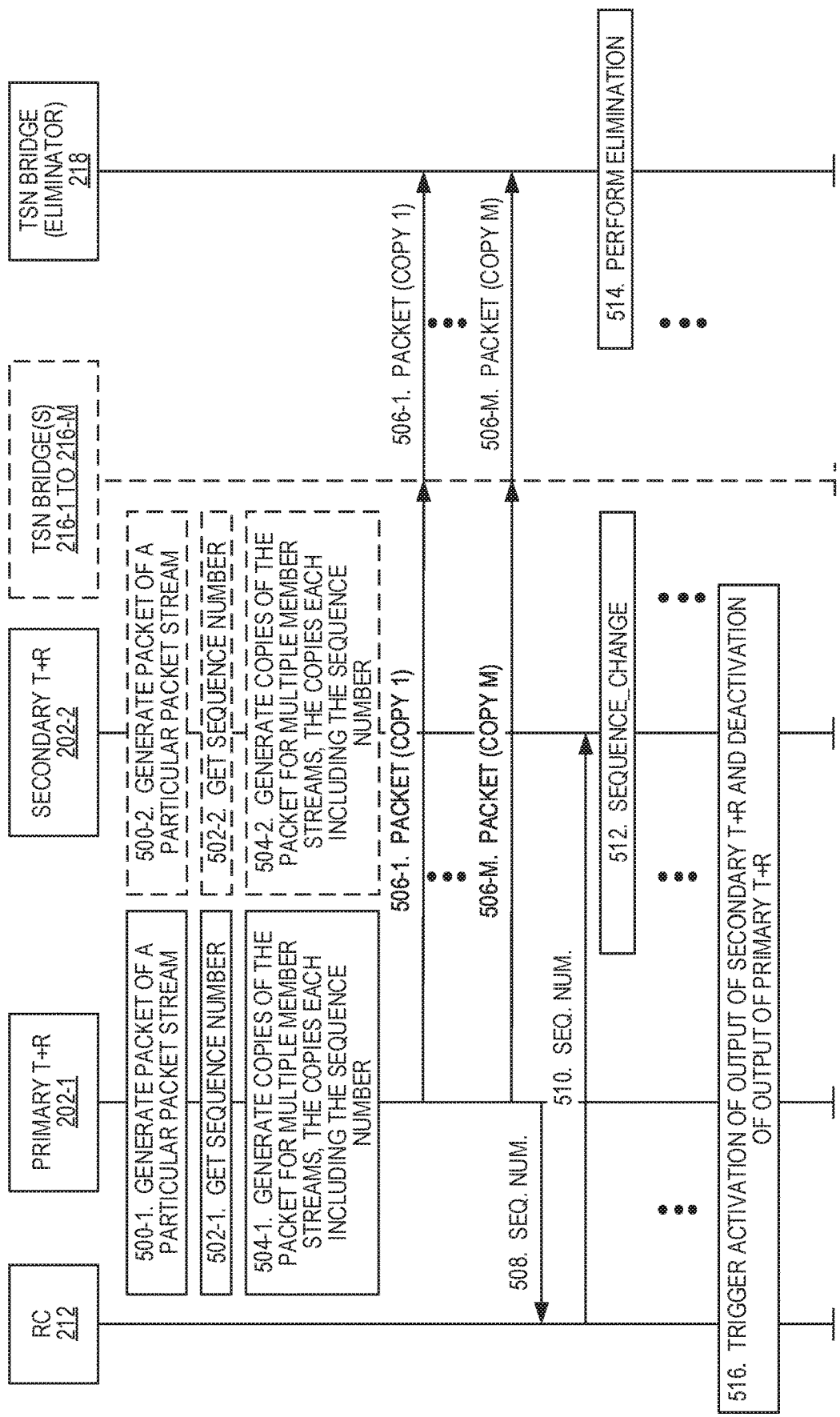
FIGS. 5A and 5B illustrate the operation of the TSN network in accordance with some other embodiments of the present disclosure.
Figure 5B:
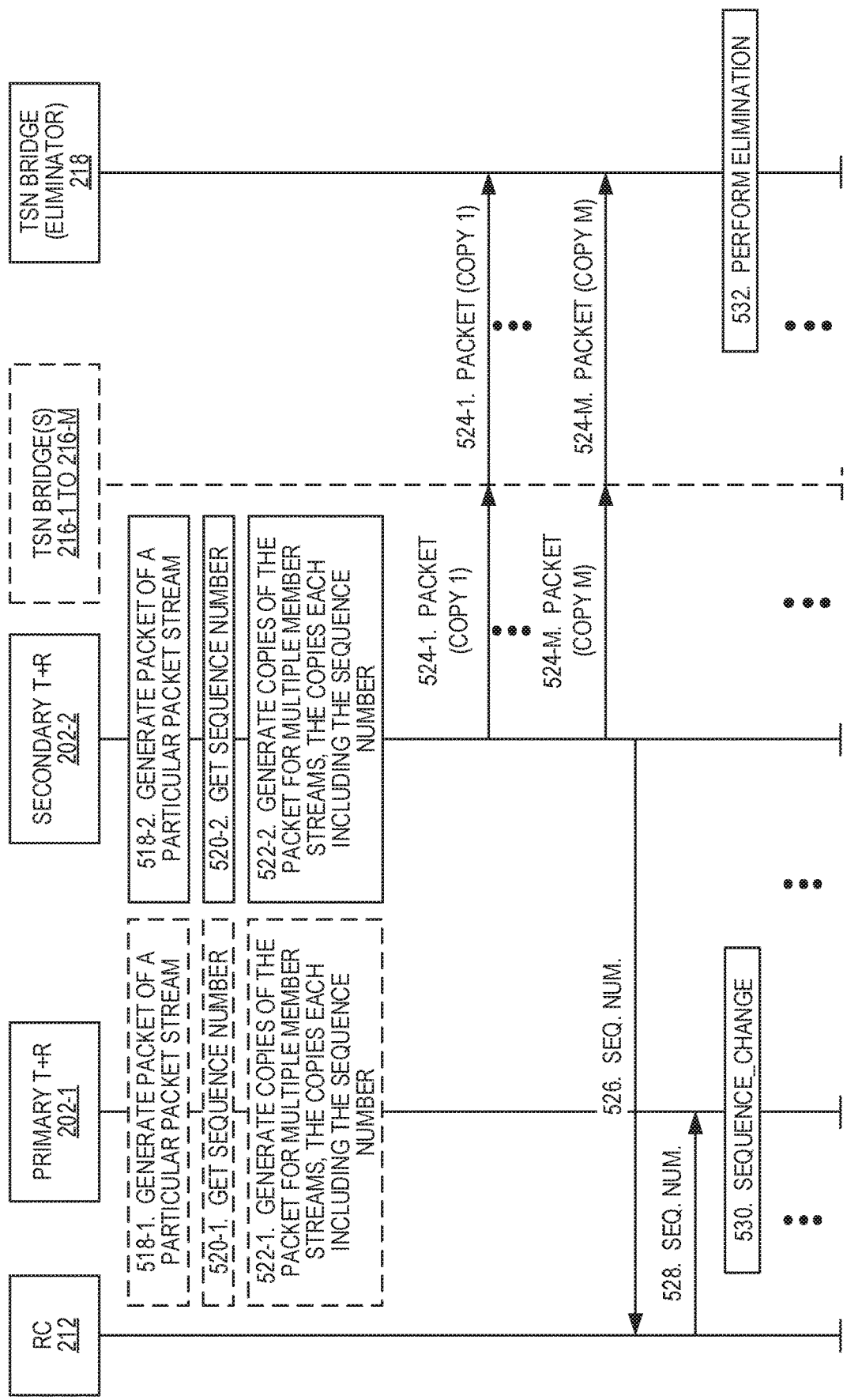

In this regard, FIGS. 5A and 5B illustrate the operation of the TSN network 200 to provide warm (1+n) backup in accordance with some embodiments of the present disclosure. Optional steps are represented with dashed lines or boxes. As illustrated, in this example, the primary T+R entity 202-1, and in particular the TSN endpoint 104-1, generates a packet of a particular packet stream (also referred to herein as a TSN stream) (step 500-1). The primary T+R entity 202-1, and in particular the sequence generation function 210-1, gets a sequence number for the packet (step 502-1). The primary T+R entity 202-1, and in particular the replication function 108-1, generates M copies of the packet for M copies of the packet stream (also referred to herein as Member Streams) (step 504-1). Each of the M copies of the packet include the sequence number from step 502-1. Optionally, the secondary T+R entity 202-2, and in particular the TSN endpoint 104-2, also generates the same packet of the particular packet stream (step 500-2). The secondary T+R entity 202-2, and in particular the sequence generation function 210-2, gets the same sequence number for the packet (step 502-2). The secondary T+R entity 202-2, and in particular the replication function 108-2, generates the M copies of the packet for the M copies of the packet stream (also referred to herein as Member Streams) (step 504-2). Each of the M copies of the packet include the sequence number from step 502-2.

In this example, at this point, output of the primary T+R entity 202-1 is activated and the output of the secondary T+R entity 202-2 is inactivated (e.g., as controlled by the redundancy controller 212). As such, the primary T+R entity 202-1, and in particular the replication function 208-1, transmits M copies of the packet over M different paths through the TSN network 200 (steps 506-1 through 506-M). Note that the secondary T+R entity 202-2 does not transmit the M copies of the packet. In addition, in this example, the primary T+R entity 202-1, and in particular the replication function 208-1, sends, to the redundancy controller 212, an indication of either the sequence number of the packet or a sequence number of a next packet to be transmitted for the particular stream (step 508). For example, the replication function 208-1 sends its "GenSeqNum" value, which at this point is equal to the sequence number to be used for the next packet to be transmitted for the particular stream.

In order to synchronize the states of the primary T+R entity 202-1 and the secondary T+R entity 202-2, the redundancy controller 212 sends, to the secondary T+R entity 202-2, either the sequence number of the packet or the sequence number of the next packet to be transmitted for the particular stream (step 510). At the secondary T+R entity 202-2, a SEQUENCE_CHANGE event is triggered (step 512). When this event is triggered, the sequence generation function 210-2 is configured with the sequence number of the next packet to be transmitted for the particular stream, based on the information received from the redundancy controller 212 in step 510 (step 512). In particular, the "GenSeqNum" value is set to the sequence number of the next packet to be transmitted for the particular stream.

Some or all of the M copies of the packet are ultimately received by the TSN bridge 218, where the elimination function 220 uses the sequence number contained in the copies of the packet to perform an elimination procedure that discards duplicate packets (step 514). After elimination, the resulting packet stream is transmitted to the TSN endpoint 214.

The process continues in this manner such that packets for the packet stream are generated, replicated, and transmitted by the primary T+R entity 202-1. Each time a new packet is transmitted, the primary T+R entity 202-1 sends the corresponding sequence number to the redundancy controller 212.

At some point, the primary T+R entity 202-1 fails or there is otherwise a desire to activate the output of the secondary T+R entity 102-2. At this point, the redundancy controller 212 triggers activation of the output of the secondary T+R entity 202-2 and deactivation of the output of the primary T+R entity 202-1 (step 516).

The secondary T+R entity 202-2, and in particular the TSN endpoint 104-2, generates a next packet of the particular packet stream (step 518-2). The secondary T+R entity 202-2, and in particular the sequence generation function 210-2, gets the sequence number for the next packet (step 520-2). Because the sequence generation function 210-2 has been configured by setting the "GenSeqNum" value to the sequence number of the next packet to be transmitted for the particular stream, the sequence number generated for the next packet is the next expected sequence number for the stream. The secondary T+R entity 202-2, and in particular the replication function 108-2, generates M copies of the next packet for the M copies of the packet stream (step 522-2). Each of the M copies of the packet include the sequence number from step 520-2. Optionally, the primary T+R entity 202-1, and in particular the TSN endpoint 104-1, also generates the next packet of the particular packet stream (step 518-1). The primary T+R entity 202-1, and in particular the sequence generation function 210-1, gets the same sequence number for the next packet (step 520-1). The primary T+R entity 202-1, and in particular the replication function 108-1, generates the M copies of the next packet for the M copies of the packet stream (step 522-1). Each of the M copies of the packet include the sequence number from step 520-1.

Since the output of the secondary T+R entity 202-2 is active, the secondary T+R entity 202-2, and in particular the replication function 208-2, transmits the M copies of the next packet over M different paths through the TSN network 200 (steps 524-1 through 524-M). In addition, in this example, the secondary T+R entity 202-2, and in particular the replication function 208-2, sends the sequence number of this next packet or the sequence number of the following packet to the redundancy controller 212 (step 526).

In order to synchronize the states of the primary T+R entity 202-1 and the secondary T+R entity 202-2, the redundancy controller 212 sends, to the primary T+R entity 202-1, either the sequence number of the packet transmitted in step 524 or the sequence of the next packet to be transmitted for the particular stream (step 528). At the primary T+R entity 202-1, a SEQUENCE_CHANGE event is triggered (step 530). When this event is triggered, the sequence generation function 210-1 is configured with the sequence number of the next packet to be transmitted for the particular stream, based on the information received from the redundancy controller 212 in step 528 (step 530). In particular, the "GenSeqNum" value is set to the sequence number of the next packet to be transmitted for the particular stream.

Some or all of the M copies of the next packet are ultimately received by the TSN bridge 218, where the elimination function 220 uses the sequence number contained in the copies of the packet to perform an elimination procedure that discards duplicate packets (step 532). After elimination, the resulting packet stream is transmitted to the TSN endpoint 214.

The process continues in this manner such that packets for the packet stream are generated, replicated, and transmitted by the secondary T+R entity 202-2. Each time a new packet is transmitted, the secondary T+R entity 202-2 sends the corresponding sequence number or the next sequence number to the redundancy controller 212.

Note that while in FIGS. 5A and 5B (and likewise in FIGS. 3A and 3B) only two T+R entities 202 are illustrated, this is only an example. There may be any number of two or more T+R entities 202 depending on the particular implementation.

Figure 6:
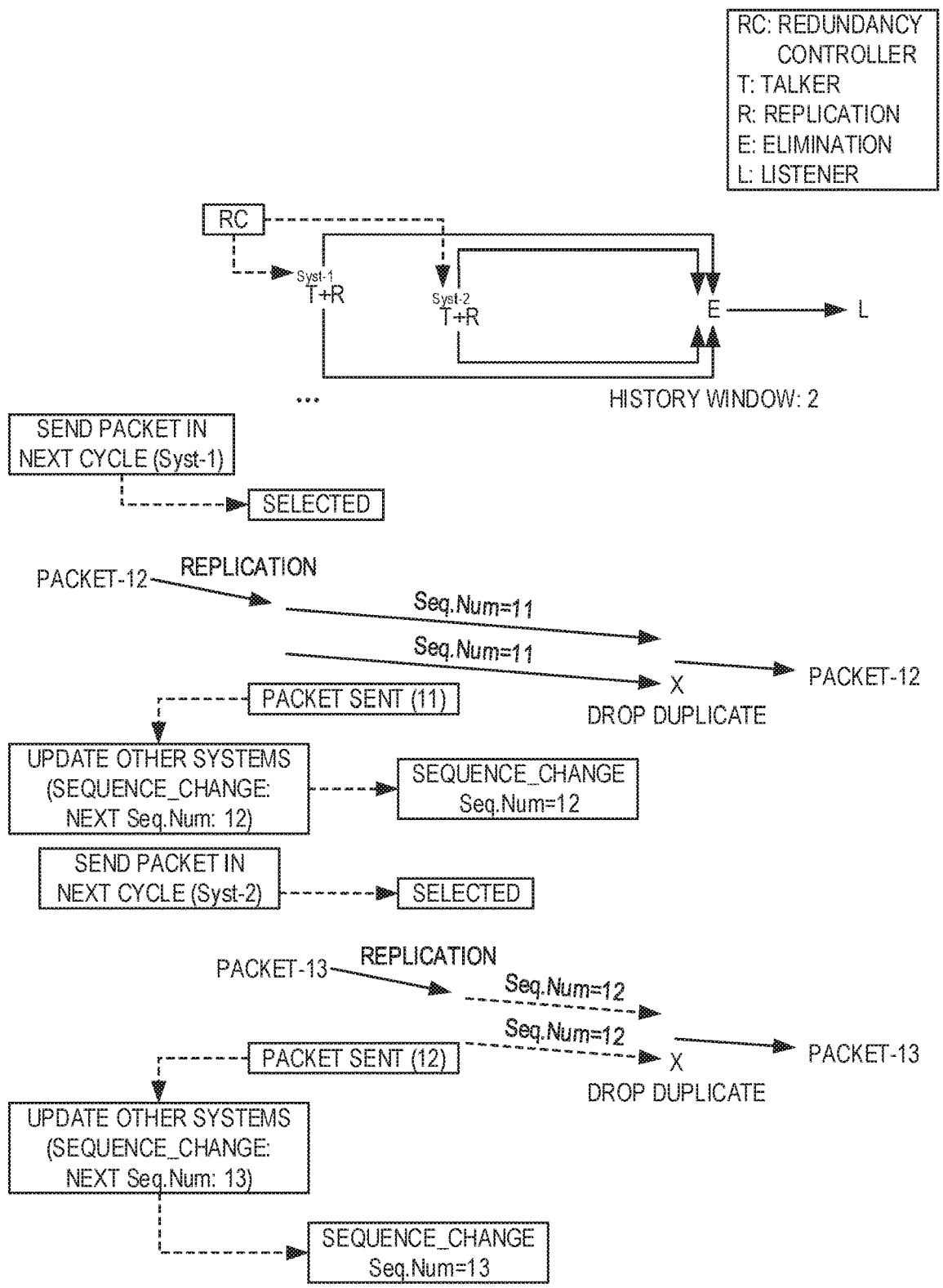
FIG. 6 illustrates one example of changing the "GenSeqNum" when a SEQUENCE_CHANGE event occurs in a warm (1+n) redundancy scenario.

FIG. 6 illustrates one example of changing the "GenSeqNum" when a SEQUENCE_CHANGE event occurs in a warm (1+n) redundancy scenario. As illustrated, the redundancy controller 212 instructs the primary T+R entity 202-1 to send the next packet (Packet-12) in the stream. As such, the primary T+R entity 202-1 replicates Packet-12 and transmits two copies of Packet-12, each containing Seq.Num=11. While not illustrated, the primary T+R entity 202-1 provides either the sequence number (Seq.Num=11) of this packet or the sequence number (Seq.Num=12) of the next packet to the redundancy controller 212. The redundancy controller 212, provides this information to the secondary T+R entity 202-2, where a SEQUENCE_CHANGE EVENT is triggered to modify the sequence number at the secondary T+R entity 202-2 to a value of 12. The redundancy controller 212 instructs the secondary T+R entity 202-2 to transmit the next packet (Packet-13). As such, the secondary T+R entity 202-2 generates, replicates, and sends Packet-13 with Seq.Num=13. The process continues in this manner.

Figure 7:
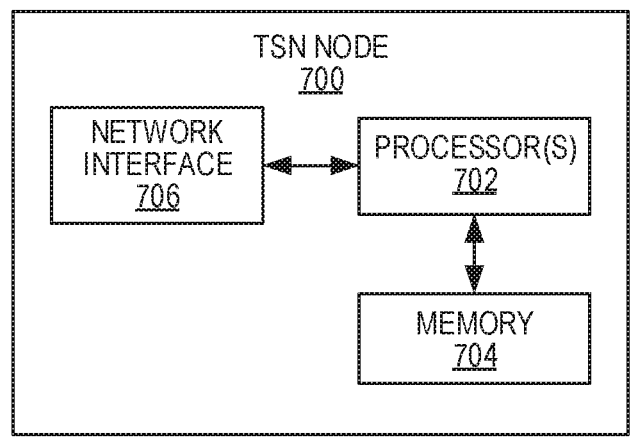
FIG. 7 is a schematic block diagram of a TSN node according to some embodiments of the present disclosure.

FIG. 7 is a schematic block diagram of a TSN node 700 according to some embodiments of the present disclosure. The TSN node 700 may be, for example, a TSN endpoint (e.g., TSN endpoint 204 or 214), a TSN bridge (e.g., TSN bridge 206 or 118), a combined TSN endpoint and TSN bridge, or any type of node that implements a FRER function (e.g., a Talker function, a Replication function, or an Elimination function). As illustrated, the TSN node 700 includes one or more processors 702 (e.g., Central Processing Units (CPUs), Application Specific Integrated Circuits (ASICs), Field Programmable Gate Arrays (FPGAs), and/or the like), memory 704, and one or more network interfaces 706. The one or more processors 702 are also referred to herein as processing circuitry. The one or more processors 704 operate to control the TSN node 700 to provide one or more functions of a TSN endpoint (e.g., TSN endpoint 204 or 214), a TSN bridge (e.g., TSN bridge 206 or 218), a combined TSN endpoint and TSN bridge, or a FRER function (e.g., a Talker function, a Replication function, or an Elimination function), as described herein. In some embodiments, the function(s) are implemented in software that is stored, e.g., in the memory 704 and executed by the one or more processors 702.

Figure 8:
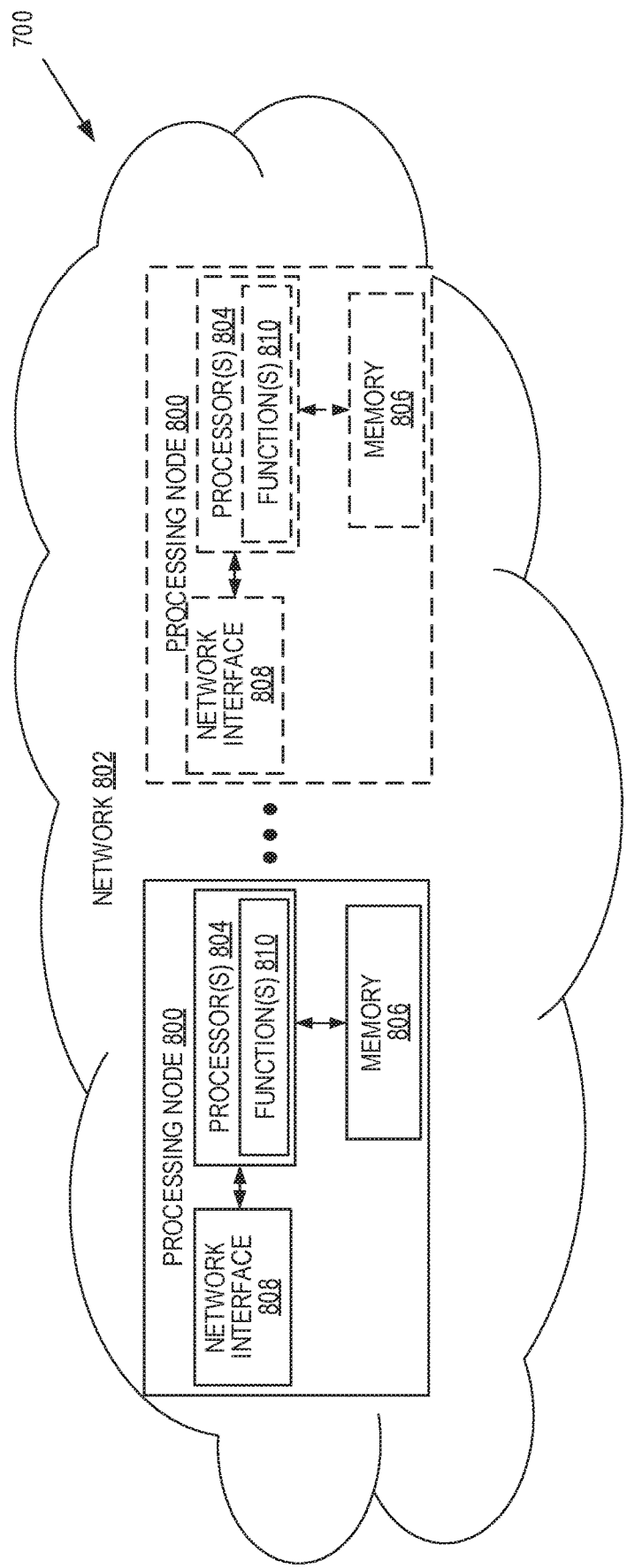
FIG. 8 is a schematic block diagram that illustrates a virtualized embodiment of the TSN node of FIG. 7 according to some embodiments of the present disclosure.

FIG. 8 is a schematic block diagram that illustrates a virtualized embodiment of the TSN node 700 according to some embodiments of the present disclosure. As used herein, a "virtualized" TSN node is an implementation of the TSN node 700 in which at least a portion of the functionality of the TSN node 700 is implemented as a virtual component(s) (e.g., via a virtual machine(s)) executing on a physical processing node(s) 800 in a network(s) 802. As illustrated, in this example, each processing node 800 includes one or more processors 804 (e.g., CPUs, ASICs, FPGAs, and/or the like), memory 806, and one or more network interfaces 808.

In this example, functions 810 of the TSN node 700 described herein (e.g., one or more functions of a TSN endpoint (e.g., TSN endpoint 204 or 214), a TSN bridge (e.g., TSN bridge 206 or 218), a combined TSN endpoint and TSN bridge, or a FRER function (e.g., a Talker function, a Replication function, or an Elimination function), as described herein) are implemented at one of the processing nodes 800 or distributed across two or more of the processing nodes 800 in any desired manner. In some particular embodiments, some or all of the functions 810 of the TSN node 700 described herein are implemented as virtual components executed by one or more virtual machines implemented in a virtual environment(s) hosted by the processing node(s) 800.

In some embodiments, a computer program including instructions which, when executed by at least one processor, causes the at least one processor to carry out the functionality of TSN node 700 or a node (e.g., a processing node 800) implementing one or more of the functions 810 of the TSN node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
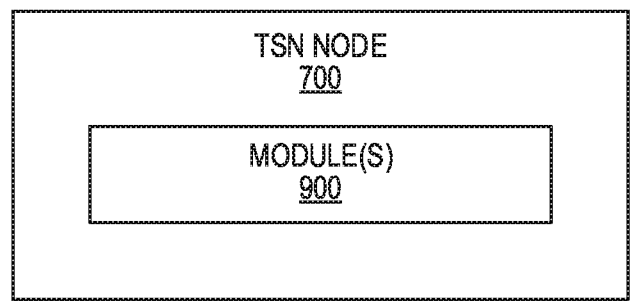
FIG. 9 is a schematic block diagram of the TSN node of FIG. 7 according to some other embodiments of the present disclosure.

FIG. 9 is a schematic block diagram of the TSN node 700 according to some other embodiments of the present disclosure. The TSN node 700 includes one or more modules 900, each of which is implemented in software. The module(s) 900 provide the functionality of the TSN node 700 described herein (e.g., one or more functions of a TSN endpoint (e.g., TSN endpoint 204 or 214), a TSN bridge (e.g., TSN bridge 206 or 218), a combined TSN endpoint and TSN bridge, or a FRER function (e.g., a Talker function, a Replication function, or an Elimination function), as described herein). This discussion is equally applicable to the processing node 800 of FIG. 8 where the modules 900 may be implemented at one of the processing nodes 800 or distributed across multiple processing nodes 800.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

ASIC Application Specific Integrated Circuit
CPU Central Processing Unit
DetNet Deterministic Networking
DSP Digital Signal Processor
FPGA Field Programmable Gate Array
FRER Frame Replication and Elimination for Reliability
IEEE Institute of Electrical and Electronics Engineers
PREF Packet Replication and Elimination Function
RAM Random Access Memory
RC Redundancy Controller
ROM Read Only Memory
TG Task Group
T+R Talker and Replication
TSN Time Sensitive Networking
WG Working Group Those skilled in the art will recognize improvements and modifications to the embodiments of the present disclosure. All such improvements and modifications are considered within the scope of the concepts disclosed herein.

What is claimed is:

1. A method performed by a system for replication in a Time Sensitive Networking, TSN, network or a Deterministic Networking, DetNet, network, comprising:
at a primary replication function:
obtaining a packet in a particular stream of packets;
obtaining, by a sequence generation function of the primary replication function, a sequence number for the packet in the particular stream of packets;
generating M copies of the packet for the particular stream of packets, each copy of the packet comprising the sequence number generated by the sequence generation function;
transmitting the M copies of the packet via M respective paths through the TSN network or the DetNet network; and
providing, to a redundancy controller, the sequence number or a next sequence number of a next packet to be transmitted for the particular stream of packets;
at the redundancy controller:
receiving, from the primary replication function, the sequence number or the next sequence number of the next packet to be transmitted for the particular stream of packets; and
providing the sequence number or the next sequence number of the next packet to a secondary replication function for the particular stream, the primary replication function and the secondary replication function being redundant replication functions for the particular stream of packets; and
at the secondary replication function:
receiving, from the redundancy controller, the sequence number or the next sequence number of the next packet; and
based on the sequence number or the next sequence number of the next packet received from the redundancy controller, configuring a sequence generation function of the secondary replication function with the next sequence number for the next packet in the particular stream of packets, wherein the next sequence number of the next packet is a subsequent sequence number following the sequence number of the packet transmitted by the primary replication function.

2. A method of operation of a secondary replication function for a particular stream of packets in a Time Sensitive Networking, TSN, network or a Deterministic Networking, DetNet, network, comprising:
receiving, from a redundancy controller, a sequence number inserted into a last packet replicated and transmitted by a primary replication function for the particular stream of packets or a next sequence number for a next packet to be transmitted for the particular stream of packets; and
based on the sequence number or the next sequence number, configuring a sequence generation function of the secondary replication function with the next sequence number for the next packet to be transmitted for the particular stream of packets.

3. The method of claim 2 wherein:
receiving the sequence number or the next sequence number comprises receiving the sequence number or the next sequence number during a cold-start of the secondary replication function for the particular stream of packets; and configuring the sequence number generation function comprises initializing the sequence generation function of the secondary replication function with the next sequence number.

4. The method of claim 3 wherein the TSN network or the DetNet network is a TSN network, and initializing the sequence generation function of the secondary replication function with the next sequence number comprises configuring a GenSeqNum parameter utilized by the sequence generation function of the secondary replication function with the next sequence number in association with a BEGIN event.

5. The method of claim 3 further comprising:
obtaining a next packet in the particular stream of packets;
obtaining, by the sequence generation function of the secondary replication function, the next sequence number for the next packet in the particular stream of packets;
generating M copies of the next packet for the particular stream of packets, each copy of the next packet comprising the next sequence number obtained by the sequence generation function; and
transmitting the M copies of the next packet via M respective paths through the TSN network or the DetNet network.

6. The method of claim 2 wherein:
receiving the sequence number or the next sequence number comprises receiving the sequence number or the next sequence number during a state synchronization procedure between the primary replication function and the secondary replication function; and
configuring the sequence generation function comprises configuring the sequence generation function of the secondary replication function with the next sequence number in association with the state synchronization procedure.

7. The method of claim 6 wherein the TSN network or the DetNet network is a TSN network, and configuring the sequence generation function of the secondary replication function with the next sequence number in association with the state synchronization procedure comprises configuring a GenSeqNum parameter utilized by the sequence generation function of the secondary replication function with the next sequence number in association with a SEQUENCE_CHANGE event.

8. The method of claim 6 further comprising:
obtaining a next packet in the particular stream of packets;
obtaining, by the sequence generation function of the secondary replication function, the next sequence number for the next packet in the particular stream of packets; and
generating M copies of the next packet for the particular stream of packets, each copy of the next packet comprising the next sequence number obtained by the sequence generation function.

9. The method of claim 8 further comprising:
receiving, from the redundancy controller, a trigger to activate output of the secondary replication function; and
transmitting the M copies of the next packet via M respective paths through the TSN network or the DetNet network responsive to receiving the trigger to activate the output of the secondary replication function.

10. A method of operation of a primary replication function for a particular stream of packets in a Time Sensitive Networking, TSN, network or a Deterministic Networking, DetNet, network, comprising:
obtaining a packet in a particular stream of packets;
obtaining, by a sequence generation function of the primary replication function, a sequence number for the packet in the particular stream of packets;
generating M copies of the packet for the particular stream of packets, each copy of the packet comprising the sequence number generated by the sequence generation function;
transmitting the M copies of the packet via M respective paths through the TSN network or the DetNet network; and
providing, to another network entity that does not receive any of the M copies of the packet nor is configured to generate copies of the packet, the sequence number or a next sequence number for a next packet in the particular stream of packets.

11. The method of claim 10 further comprising:
obtaining a next packet in a particular stream of packets;
obtaining, by the sequence generation function of the primary replication function, the next sequence number for the next packet in the particular stream of packets;
generating M copies of the next packet for the particular stream of packets, each copy of the next packet comprising the next sequence number obtained by the sequence generation function;
transmitting the M copies of the next packet via the M respective paths through the TSN network or the DetNet network; and
providing, to the another network entity, the next sequence number or a sequence number of a packet following the next packet in the particular stream of packets.

12. The method of claim 10 wherein the another network entity is a redundancy controller.

13. A method of operation of a redundancy controller in a Time Sensitive Networking, TSN, network or a Deterministic Networking, DetNet, network, comprising:
obtaining, from a primary replication function for a particular stream of packets in the TSN network or the DetNet network and at the redundancy controller, a sequence number inserted into a last packet replicated and transmitted by the primary replication function for the particular stream or a next sequence number for a next packet to be transmitted for the particular stream of packets, wherein the primary replication function is in a first network entity, the redundancy controller is not in the first network entity, and the redundancy controller is not configured to receive packets and is not configured to generate the packets; and
providing the sequence number or the next sequence number to a secondary replication function for the particular stream from the redundancy controller, the primary replication function and the secondary replication function being redundant replication functions for the particular stream of packets, wherein the secondary replication function is in a second network entity and the redundancy controller is not in the second network entity.

14. The method of claim 13 wherein:
providing the sequence number or the next sequence number to the secondary replication function comprises providing the sequence number or the next sequence number to the secondary replication function during a cold-start of the secondary replication function for the particular stream of packets.

15. The method of claim 13 wherein:
providing the sequence number or the next sequence number to the secondary replication function comprises providing the sequence number or the next sequence number to the secondary replication function during a state synchronization procedure between the primary replication function and the secondary replication function.

16. The method of claim 15 further comprising:
providing a trigger to the primary replication function to deactivate an output of the primary replication function for the next packet and a trigger to the secondary replication function to activate an output of the secondary replication function for the next packet.

* * * * *